(12) United States Patent
Jungk et al.

(10) Patent No.: US 8,251,116 B2
(45) Date of Patent: Aug. 28, 2012

(54) DEVICE FOR TURNING UP A TIRE-BUILDING COMPONENT ON A TIRE-BUILDING DRUM

(75) Inventors: Andreas Jungk, Wedemark (DE); Martin Gerighausen, Barsinghausen (DE)

(73) Assignee: Continental Aktiengesellschaft, Hannover (DE)

( * ) Notice: Subject to any disclaimer, the term of this patent is extended or adjusted under 35 U.S.C. 154(b) by 837 days.

(21) Appl. No.: 12/254,924

(22) Filed: Oct. 21, 2008

(65) Prior Publication Data
US 2009/0084490 A1    Apr. 2, 2009

Related U.S. Application Data

(63) Continuation of application No. PCT/EP2007/051982, filed on Mar. 2, 2007.

(30) Foreign Application Priority Data

Apr. 21, 2006    (DE) .................. 10 2006 018 508

(51) Int. Cl.
*B29D 30/32* (2006.01)
*B29D 30/26* (2006.01)
(52) U.S. Cl. .................. 156/402; 156/132
(58) Field of Classification Search .............. 156/132, 156/400, 402
See application file for complete search history.

(56) References Cited

U.S. PATENT DOCUMENTS

| 2,614,952 A | * | 10/1952 | Kraft | 156/130 |
| 3,093,531 A | | 6/1963 | Fröhlich et al. | |
| 3,887,423 A | | 6/1975 | Gazuit | |
| 4,214,940 A | * | 7/1980 | Rost | 156/402 |
| 7,152,649 B2 | | 12/2006 | Sala | |

FOREIGN PATENT DOCUMENTS

| DE | 19934791 C1 | 7/2000 |
| EP | 0808707 A2 | 11/1997 |
| FR | 2093180 A5 | 1/1972 |
| WO | 0108874 A1 | 2/2001 |

OTHER PUBLICATIONS

International Search Report dated May 15, 2007.

* cited by examiner

*Primary Examiner* — Geoffrey L Knable
(74) *Attorney, Agent, or Firm* — Laurence A. Greenberg; Werner H. Stemer; Ralph E. Locher

(57) ABSTRACT

An apparatus for upturning a tire-building component on a tire-building drum has a roller lever. To provide an apparatus which is capable of upturning a tire-building component on a tire-building drum, and which achieves the upturn of the tire-building component without defects, in particular unintended creasing in the side wall, it is proposed that, during the procedure of preparation for upturning, a spacer provides separation between the roller and the segment in such a way that the roller is in essence in contact exclusively with the tire-building component. The roller therefore rolls along the tire-building component.

6 Claims, 2 Drawing Sheets

DEVICE FOR TURNING UP A TIRE-BUILDING COMPONENT ON A TIRE-BUILDING DRUM

CROSS-REFERENCE TO RELATED APPLICATIONS

This is a continuation, under 35 U.S.C. § 120, of copending international application No. PCT/EP2007/051982, filed Mar. 2, 2007, which designated the United States; this application also claims the priority, under 35 U.S.C. § 119, of German patent application No. DE 10 2006 018 508.0, filed Apr. 21, 2006; the prior applications are herewith incorporated by reference in their entireties.

BACKGROUND OF THE INVENTION

Field of the Invention

The invention relates to a device for turning up a tire-building component on a tire-building drum with a roller lever.

During the conventional manufacture of new tires, a manufacturing step is carried out on a tire-building drum during which the carcass of the tire which initially lies flat is cambered by an expansion process. The actual cambering process of the tire is carried out, for example, by a center bellows which expands the central region of the carcass. Then, during the process, the two outer side walls on the cambered carcass are turned up and in the process folded around the bead cores. The process of rolling up the side walls of the tire is carried out either with what are referred to as side cambering bellows or with a roller lever system which is arranged in the form of an annulus over the circumference. When side cambering bellows are used, two inflating bellows which are arranged in the region of the side wall layers are inflated and in this way press the side walls against the cambered carcass. The turning-up process using side cambering bellows can have the disadvantage that these bellows do not act as far the shoulder regions of the tire blank, as a result of which subsequent manual work becomes necessary. Furthermore, the side cambering bellows are subject to a high degree of wear, making correspondingly frequent replacement necessary, which is very time consuming.

The turning up of the side walls using a roller lever system is disclosed, for example, in German patent DE 199 34 791 C1. In this device, the spreading apart of the roller lever system is carried out by a pneumatic drive which is composed of two separate pneumatic cylinders. The two pneumatic cylinders are supplied with compressed air separately, as a result of which the tire lever system is spread apart and as a result the side walls on the carcass are turned up.

A significant disadvantage of this principle is that when there are thin sensitive side walls and given the specific tire designs, the rotational movement of the rollers in opposite directions can lead to unacceptable faults, for example in the form of the formation of folds or of displacement of material in the tire blank. As a result of the contact with the lateral surfaces of the tire, for example with the core-clamping segments or other parts of the tire-building drum, a rotational movement of the rollers is inevitably produced at the start of the roller lever movement and this rotational movement moves the tire-building components into the gap between the core segment and roller and as a result promotes unacceptable formation of folds, in particular in the case of thin materials. This formation of folds can cause the tire blank to be rejected.

SUMMARY OF THE INVENTION

It is accordingly an object of the invention to provide a device for turning up a tire-building component on a tire-building drum that overcomes the above-mentioned disadvantages of the prior art devices of this general type, with which the tire-building component is turned up without faults, in particular without unintentional formation of folds in the side wall.

With the foregoing and other objects in view there is provided, in accordance with the invention, a device for turning up a tire-building component and disposed on a tire-building drum. The device contains a roller lever, at least one rotatably mounted roller rotatably mounted on the roller lever, a spacer, and a segment disposed opposite the roller lever. The roller lever is disposed movable with respect to the segment. During a process of preparing a turning up, the roller and the segment are spaced apart from one another by the spacer such that the roller is generally in contact only with the tire-building component, and the roller rolls along the tire-building component.

The object is achieved according to the invention in that during the process of preparing the turning up the roller and the segment are spaced apart from one another by the spacer in such a way that the roller is essentially in contact only with the tire-building component, and the roller rolls along the tire-building component.

An advantage of the invention is in particular the fact that the device according to the invention efficiently avoids folds and other faults in the turning up of the side wall and of the bead components. The roller on the roller lever does not have any contact with the segment lying opposite, as a result of which the roller does not roll on this segment and a rotational movement of the roller in the opposite direction does not unintentionally fold or push together the tire-building component resting on it. Instead, the roller is now essentially in contact only with the tire-building component resting on it and therefore in the initial phase of the working stroke or during the preparation of the turning up of the tire-building component it rolls along the tire-building component. In this way, production faults on the tire, in particular on the tire side wall, are prevented to a high degree. Furthermore, tires can be fabricated with an extended dimensional range compared to the previous method of the prior art.

In one advantageous development of the invention there is provision that the spacer contains a cam on the roller lever, and a cam on the segment which is located opposite, the cams sliding one on the other during the process of preparing the turning up. The cam on the roller lever easily slides up on the ramp-shaped cam of the segment lying opposite. The frictional sliding during this process is negligibly small.

In a further advantageous development of the invention there is provision that at least one of the cams on the roller lever or on the segment is replaced by rolling guides or a roller bearing. The friction which occurs between such spacers is negligibly small.

In a further advantageous development of the invention there is provision that the spacer is an actuator which is coupled to the roller lever. Such an actuator would ensure that at all times the roller is spaced apart from the segment lying opposite.

In a further advantageous development of the invention there is provision that the roller lever is provided with an anti-stick coating. In this way, the tire-building component which bears on the rollers and the roller lever can slide on the roller lever with low friction.

In a further advantageous development of the invention there is provision that the roller lever is composed of a metal and is sand-blasted. Sand-blasting of the metal is an easy way of providing the roller lever with an anti-stick coating.

In a further advantageous development of the invention there is provision that the roller is provided with an anti-stick coating. This ensures that the roller rolls on the tire-building component and this material does not stick to the roller.

In a further advantageous development of the invention there is provision that two rollers are arranged symmetrically by a roller bearing on the roller lever.

In a further advantageous development of the invention there is provision that the segment is a core-tensioning segment.

In a further advantageous development of the invention there is provision that the segment is a core-tensioning segment and contains a receiving recess for the roller. In this way, the roller with the roller lever is lifted up in advance in the initial phase of the working stroke and is positioned in the vicinity of the tire bead.

In a further advantageous development of the invention there is provision that the tire-building drum contains a plurality of core-tensioning segments and roller levers which are arranged axially symmetrically. This ensures that the side wall of the tire which is to be manufactured is rolled up uniformly at all locations.

In a further advantageous development of the invention there is provision that during the process of preparing the turning up the core-tensioning segments move apart from one another and as a result lifts up the rollers with the roller lever.

In a further advantageous development of the invention there is provision that the roller levers are rotatably coupled to an axially movable component of the tire-building drum and move apart from one another during the turning-up process.

Other features which are considered as characteristic for the invention are set forth in the appended claims.

Although the invention is illustrated and described herein as embodied in a device for turning up a tire-building component on a tire-building drum, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
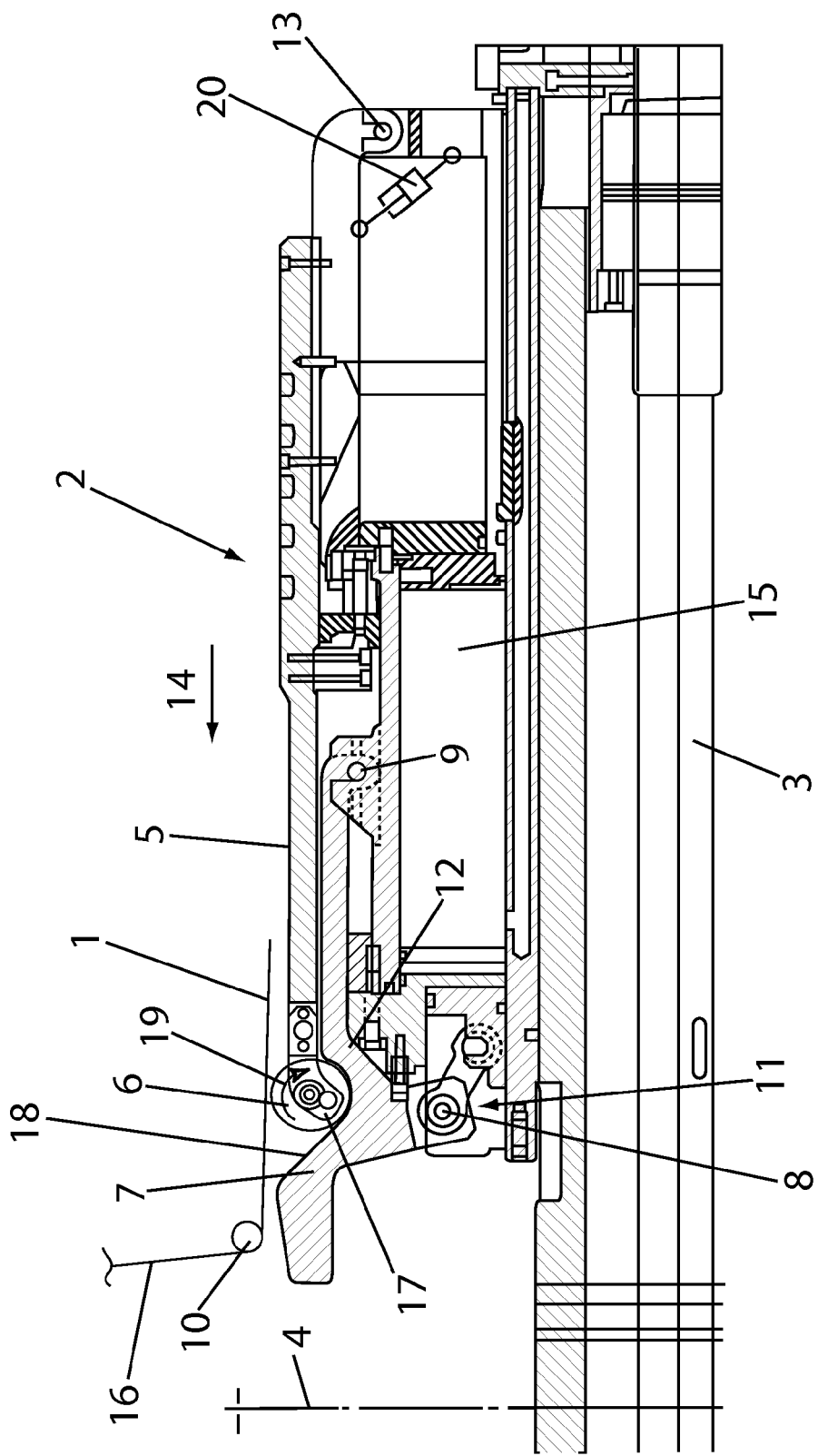
FIG. 1 is a diagrammatic, side view of a tire building drum having a device for turning up a tire-building component according to the invention.

Referring now to the figures of the drawing in detail and first, particularly, to FIG. 1 thereof, there is shown a detail of a tire-building drum 2 with a device according to the invention for turning up a tire-building component 1 which forms, inter alia, the tire side wall of the tire which is to be manufactured. The tire-building drum 2 is built essentially axially symmetrically with respect to a drum axis 3 and with respect to a drum center 4, for which reason the components which respectively lie opposite are not illustrated in the figure.

Two rollers 6 are arranged at one end on a roller lever 5, and in the side view only one roller can be seen. The second roller 6 lies directly behind the first roller 6, with both rollers 6 being arranged symmetrically in the plan view of the roller lever 5 and being connected in a rotatable fashion to the roller lever 5 by a roller bearing. Arranged opposite the roller lever 5 is a segment 7 which is a core-tensioning segment by way of its function. The segment 7 is connected via two pivot points 8 and 9 to a component of the tire-building drum 2. In a first working step for tensioning a tire core 10 the segment 7 moves radially outward. This movement is implemented by a drive device 11. The rollers 6, which rest in a recess 12 in the segment 7, are correspondingly lifted up as a result of the segments 7 moving apart. The tire-building component 1 bears essentially against the roller 6. The roller lever 5 is rotatably mounted at a pivot point 13 and moved in an axial direction 14 by the activation of a pneumatic cylinder 15. Initially, a process of preparing the turning up of the tire-building component or the process of the initial phase of the working stroke occurs. The objective of this initial phase of the working stroke is to position the rollers 6 directly in the lower region of the tire bead. Only after this is the turning up of the side walls carried out, in which process the rollers 6 roll up the tire-building component 1 against a cambered carcass 16 of the tire. The turning up is carried out by a further axial movement of the roller lever 5, which, as it were, spread apart during this movement. The roller lever 5 has, as an extension, a cam 17. A cam 18 is arranged lying opposite on the segment 7. The two cams constitute a spacer according to the invention. In the initial phase of the working stroke, the cam 17 of the roller lever 5 slides upward directly against the tire bead on the ram-shaped cam 18 of the segment 7. The roller 6 has no contact with the segment 7 during this process since the roller 6 and segment 7 are spaced apart by a gap. The roller 6 essentially has contact only with the tire-building component 1 resting on it, as a result of which the roller 6 rolls along the tire-building component 1 in a rotational direction 19. As a result, the roller 6 does not push the material of the tire-building component 1 forward and there is no unacceptable formation of folds, which would lead to rejection of the tire. After this initial phase of the working stroke, the actual turning up of the tire walls and further preparation of the tire occur in accordance with a conventional method.

In a further non-illustrated exemplary embodiment, one of the cams 17 or 18 is replaced by a roller guide or by small rollers which then constitute the spacer. Alternatively, an actuator 20 could be used. Such an actuator 20, which acts on the roller lever 5 from below, ensures that the rollers 6 of the roller lever 2 do not come into contact with the segment 7 at any time and therefore cannot roll on the latter. The actuator 20 could be controlled by an electronic controller.

Figure 2:
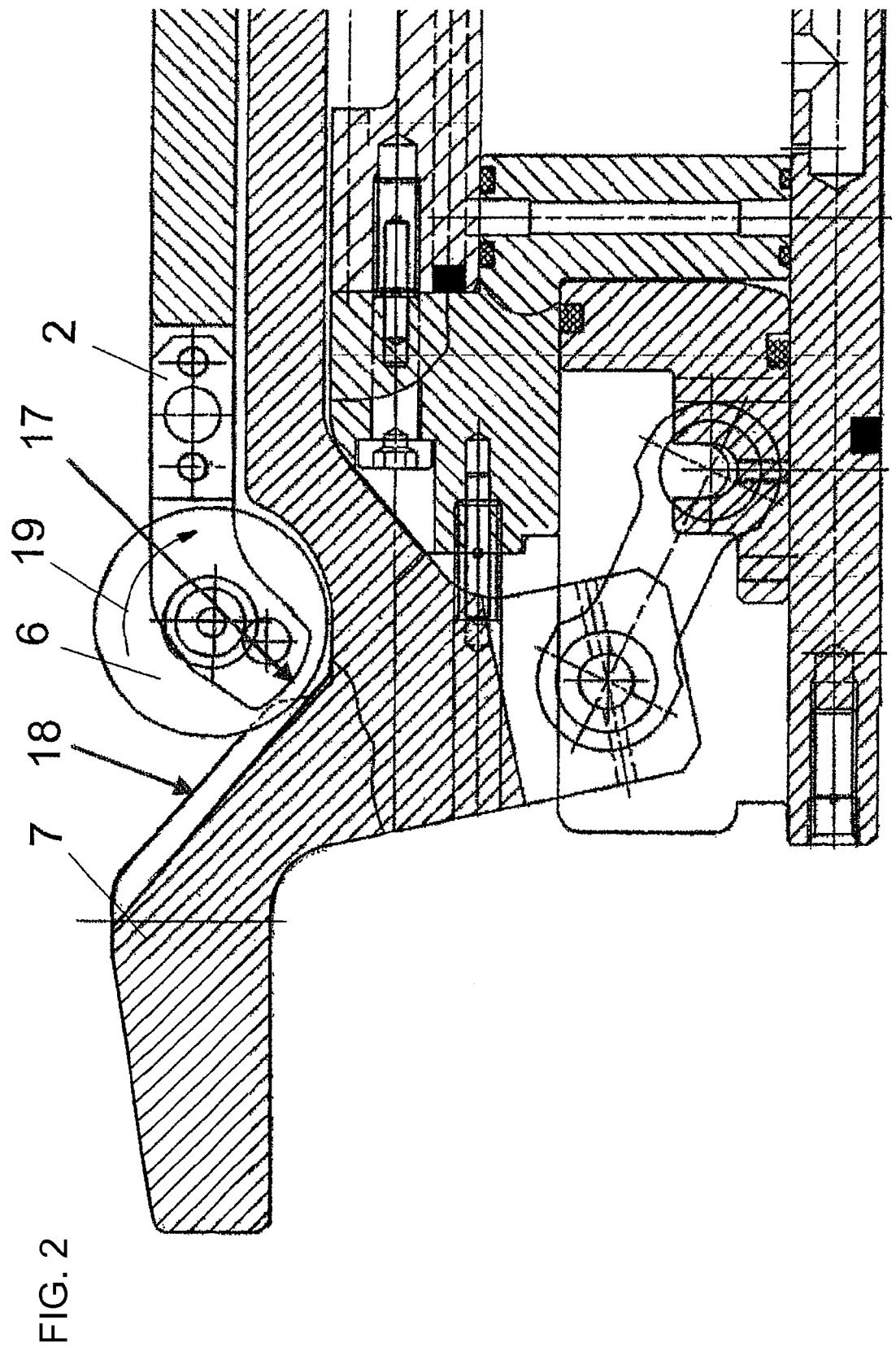
FIG. 2 is an enlarged, partial side view of the tire building drum with the device.

FIG. 2 shows an enlargement of a detail shown in FIG. 1. The roller 6 does not have any contact with the segment 7 during the initial phase of the working stroke. The cam 17 of the tire lever 2 slides up on the ramp-shaped cam 18 of the segment 7, in which case the roller 6 rolls on the tire-building component (not illustrated in FIG. 2) in the rotational direction 19 shown.

The invention claimed is:

1. A device for turning up a tire-building component disposed on a tire-building drum, the device comprising:
   a roller lever;

at least one roller rotatably mounted at one end of said roller lever;

a segment disposed opposite said roller lever, said roller lever being movable with respect to said segment;

a spacer spacing said at least one roller and said segment apart from one another during a process of preparing a turning up, such that during said process of preparing a turning up, said at least one roller is in contact with, and rolls along, a tire-building component, but does not contact said segment; and said spacer including a cam at said one end of said roller lever and a cam on said segment disposed opposite said roller lever, said cams sliding on one another to maintain a gap between said at least one roller and said segment during said process of preparing the turning up so that said at least one roller is essentially in contact only with the tire-building component resting on it, as a result of which said at least one roller rolls along the tire-building component in a single rotational direction so that the at least one roller does not push the material of the tire-building component forward.

2. The device according to claim 1, wherein said roller lever has an anti-stick coating.

3. The device according to claim 1, wherein said roller lever is composed of a metal and is sand-blasted.

4. The device according to claim 1, wherein said roller has an anti-stick coating.

5. The device according to claim 1,
further comprising a roller bearing disposed on said roller lever; and
where said roller is one of two rollers disposed symmetrically by means of said roller bearing on said roller lever.

6. The device according to claim 1, wherein said segment is a core-tensioning segment.

* * * * *